(12) United States Patent
Zhou et al.

(10) Patent No.: US 10,375,594 B2
(45) Date of Patent: Aug. 6, 2019

(54) APPARATUS AND METHOD FOR GENERATING AN ALERT BASED ON SIGNAL STRENGTH

(71) Applicant: Samsung Electronics Co. Ltd., Suwon-si, Gyeonggi-do (KR)

(72) Inventors: Min Zhou, Kirkland, WA (US); Pei Zheng, Sammamish, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 13/765,095

(22) Filed: Feb. 12, 2013

(65) Prior Publication Data

US 2014/0228053 A1 Aug. 14, 2014

(51) Int. Cl.
*H04W 24/10* (2009.01)
*H04W 4/029* (2018.01)
*H04W 88/02* (2009.01)
*H04W 36/30* (2009.01)
*H04W 4/90* (2018.01)

(52) U.S. Cl.
CPC ........... *H04W 24/10* (2013.01); *H04W 4/029* (2018.02); *G01S 2205/008* (2013.01); *H04W 4/90* (2018.02); *H04W 36/30* (2013.01); *H04W 88/02* (2013.01)

(58) Field of Classification Search
CPC .. H04W 88/02; H04W 36/30; G01S 2205/008
See application file for complete search history.

(56) References Cited

U.S. PATENT DOCUMENTS

| 6,078,816 A * | 6/2000 | Weiss ................... H04M 19/04 455/226.4 |
| 7,580,681 B2 * | 8/2009 | Jabbary ..................... 455/67.11 |
| 2004/0204183 A1 * | 10/2004 | Lencevicius .......... H04M 1/663 455/574 |
| 2006/0068731 A1 * | 3/2006 | Seier .......................... 455/226.2 |
| 2006/0135180 A1 * | 6/2006 | Jakel ..................... H04W 48/16 455/456.5 |
| 2008/0097688 A1 * | 4/2008 | Tashev ................... G01C 21/34 701/532 |
| 2009/0245118 A1 * | 10/2009 | McCormick ............ H04L 41/12 370/252 |
| 2009/0247147 A1 * | 10/2009 | Hadinata ................. H04W 4/16 455/421 |
| 2011/0144899 A1 * | 6/2011 | Soelberg ............ G01C 21/3461 701/532 |
| 2012/0143499 A1 * | 6/2012 | Petersen ............ G01C 21/3461 701/450 |
| 2013/0084855 A1 * | 4/2013 | Ekici ..................... H04W 48/18 455/432.1 |
| 2014/0067257 A1 * | 3/2014 | Dave .................. G01C 21/3461 701/423 |
| 2014/0179279 A1 * | 6/2014 | Skeba et al. ............... 455/414.1 |

\* cited by examiner

*Primary Examiner* — Jaime M Holliday (57) ABSTRACT

An apparatus and method for generating an alert on a mobile terminal based on signal strength of the mobile terminal are provided. The method includes measuring a signal strength with which the mobile terminal communicates with a network, determining whether the measured signal strength is less than a predefined signal strength threshold, and if the measured signal strength is less than the predefined signal strength threshold, generating an alert indicating that the signal strength of the mobile terminal is low.

28 Claims, 8 Drawing Sheets

APPARATUS AND METHOD FOR GENERATING AN ALERT BASED ON SIGNAL STRENGTH

BACKGROUND OF THE INVENTION

1. Field of the Invention

The present invention relates to an apparatus and method for generating an alert based on signal strength. More particularly, the present invention relates to an apparatus and method for alerting or warning a user as to a signal strength with which the mobile terminal communicates, or for alerting or warning a user when the mobile terminal is entering a zone in which the signal strength is below a certain threshold.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

As mobile terminals have become necessities of daily life, users tend to rely more and more on mobile terminals for communicating with others. For example, it is very important for a user of the mobile terminal to be able to call 911 in case of emergency. The effectiveness of mobile terminals as necessities for communicating with others is limited by the signal strength with which the mobile terminal communicates.

According to the related art, users are more and more dependent on a Global Positioning System (GPS) or map-related applications for providing navigational directions to desired destinations. Such applications generally use various optimization techniques to plan a route. In addition, such applications may allow a user to set certain variables or constraints for the applications to consider when planning a route. For example, such variables or constraints may include whether to avoid toll rolls, fastest time of arrival, shortest distance, avoidance of freeways, and the like.

Accordingly, there is a need for an apparatus and method for alerting or warning a user as to the signal strength with which the mobile terminal communicates, or for alerting or warning a user when the mobile terminal is entering a zone in which the signal strength is below a certain threshold. In addition, there is a need for an apparatus and method for planning a route in consideration of a mapped mobile terminal signal strength along the route.

SUMMARY OF THE INVENTION

Aspects of the present invention are to address at least the above-mentioned problems and/or disadvantages and to provide at least the advantages described below. Accordingly, an aspect of the present invention is to provide an apparatus and method for generating an alert on a mobile terminal based on signal strength of the mobile terminal.

In accordance with an aspect of the present invention, a method for generating an alert on a mobile terminal based on signal strength of the mobile terminal is provided. The method includes measuring a signal strength with which the mobile terminal communicates with a network, determining whether the measured signal strength is less than a predefined signal strength threshold, and if the measured signal strength is less than the predefined signal strength threshold, generating an alert indicating that the signal strength of the mobile terminal is low.

In accordance with another aspect of the present invention, a method for generating a route considering signal strength of the mobile terminal is provided. The method includes determining a start location and an end location of the route, determining whether the signal strength is a constraint in determination of the route, and if the signal strength is a constraint in determination of the route, generating the route considering at least one of a measured signal strength and an expected signal strength.

In accordance with another aspect of the present invention, an apparatus for generating an alert thereon based on signal strength of the apparatus is provided. The apparatus includes at least one of an audio processing unit and a display unit, a communication unit for communicating with a network; and at least one controller for measuring a signal strength with which the communication unit communicates with the network, for determining whether the measured signal strength is less than a predefined signal strength threshold, if the measured signal strength is less than the predefined signal strength threshold, generating an alert indicating that the signal strength of the apparatus is low, wherein the alert is output through at least one of the audio processing unit and the display unit.

In accordance with another aspect of the present invention, an apparatus for generating a route considering signal strength of the apparatus is provided. The apparatus includes a display unit, and at least one controller for determining a start location and an end location of the route, for determining whether the signal strength is a constraint in determination of the route, and if the signal strength is a constraint in determination of the route, for generating the route considering at least one of a measured signal strength and an expected signal strength, wherein the route is output via the display unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for generating an alert on a mobile terminal based on a signal strength of the mobile terminal.

Exemplary embodiments of the present invention include an apparatus and method for generating a route considering the signal strength of the mobile terminal.

Figure 1:
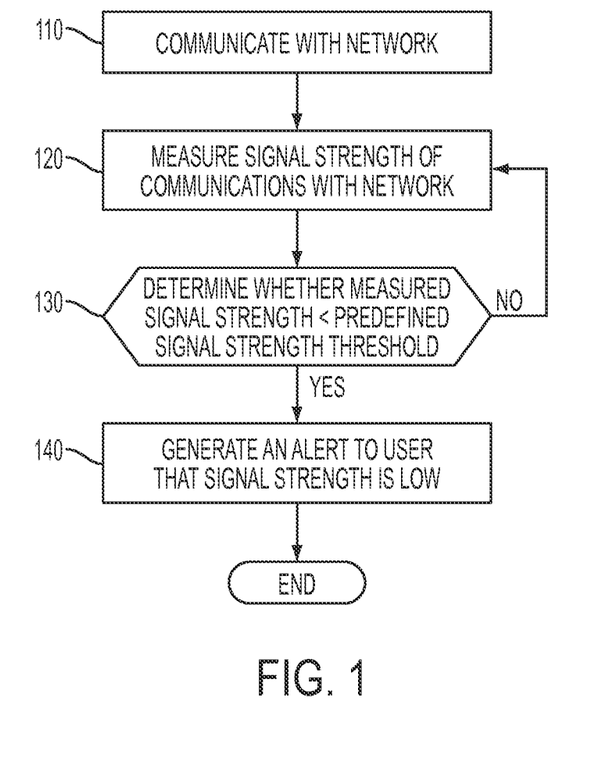
FIG. 1 is a flowchart illustrating a method of alerting a user that a signal strength is low according to an exemplary embodiment of the present invention.

FIG. 1 is a flowchart illustrating a method of alerting a user that a signal strength is low according to an exemplary embodiment of the present invention.

Referring to FIG. 1, a mobile terminal communicates with a network in step 110. For example, the mobile terminal may communicate with a cellular network via a base station. The mobile terminal may transmit and receive voice and/or data communications with the network.

In step 120, the mobile terminal measures the signal strength of the communications with the network. For example, the mobile terminal may measure the signal-to-noise ratio of the signal with which the mobile terminal communicates with the network.

In step 130, the mobile terminal determines whether the measured signal strength is greater than a predefined signal strength threshold. As an example, the predefined signal strength threshold may be configured by the user and/or the mobile terminal manufacturer.

If the measured signal is not less than the predefined signal strength threshold in step 130, then the mobile terminal returns to step 120 in which the mobile terminal measures the signal strength of the communications with the network. In contrast, if the measured signal is less than a predefined signal strength threshold in step 130, then the mobile terminal proceeds to step 140.

In step 140, the mobile terminal generates an alert to the user so as to alert the user that the signal strength of the mobile terminal is low. For example, the alert may be an audio signal, a visual alert, a vibration, and/or the like. If the alert is an audio signal, the alert may be a ringtone or other sound configured to alert the user of an event. If the alert is a visual alert, the visual alert may correspond to the flashing of an indicator light on the mobile terminal. As another example, if the alert is a visual alert, then the visual alert may correspond to a pop-up generated on the mobile terminal display unit. As yet another example, if the alert is a visual alert, then the visual alert may correspond to a status icon generated on the mobile terminal display unit.

Figure 2:
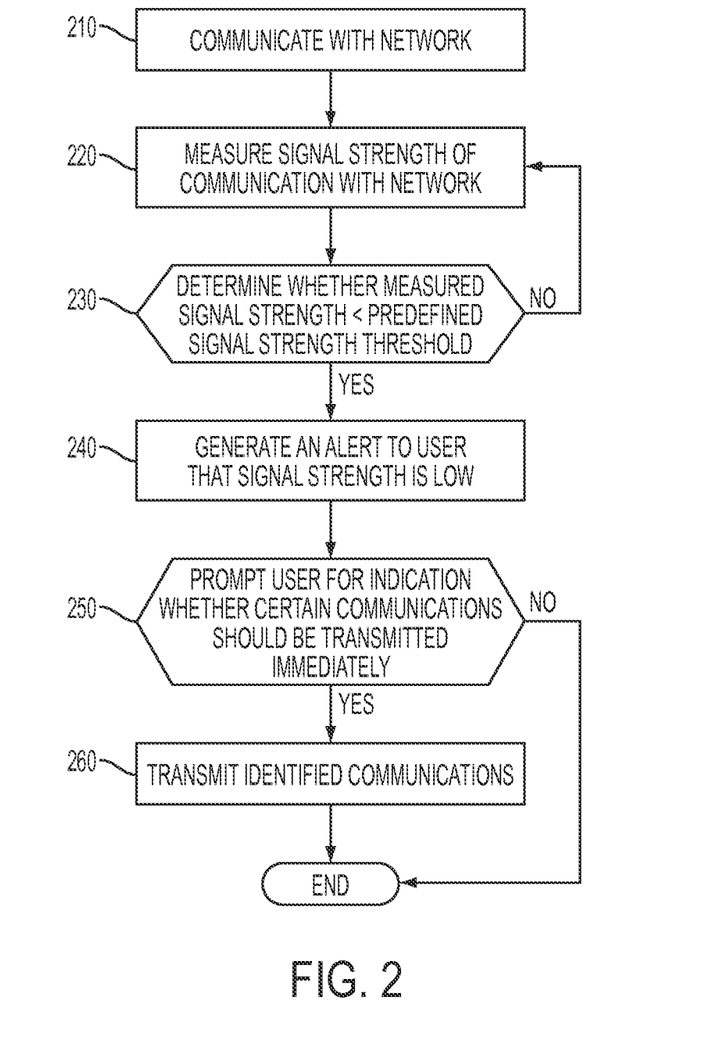
FIG. 2 is a flowchart illustrating a method of alerting a user that a signal strength is low according to an exemplary embodiment of the present invention.

FIG. 2 is a flowchart illustrating a method of alerting a user that a signal strength is low according to an exemplary embodiment of the present invention.

Referring to FIG. 2, a mobile terminal communicates with a network in step 210. For example, the mobile terminal may communicate with a cellular network via a base station. The mobile terminal may transmit and receive voice and/or data communications with the network.

In step 220, the mobile terminal measures the signal strength of the communications with the network. For example, the mobile terminal may measure the signal-to-noise ratio of the signal with which the mobile terminal communicates with the network.

In step 230, the mobile terminal determines whether the measured signal strength is greater than a predefined signal strength threshold. As an example, the predefined signal strength threshold may be configured by the user and/or the mobile terminal manufacturer.

If the measured signal is not less than the predefined signal strength threshold in step 230, then the mobile terminal returns to step 220 in which the mobile terminal measures the signal strength of the communications with the network. In contrast, if the measured strength of a signal is less than a predefined signal strength threshold in step 230, then the mobile terminal proceeds to step 240.

In step 240, the mobile terminal generates an alert to the user so as to alert the user that the signal strength of the mobile terminal is low. For example, the alert may be an audio alert, a visual alert, a vibration, and/or the like. If the alert is an audio alert, the alert may be a ringtone or other sound configured to alert the user of an event. If the alert is a visual alert, the visual alert may correspond to the flashing of an indicator light on the mobile terminal. As another example, if the alert is a visual alert, then the visual alert may correspond to a pop-up generated on the mobile terminal display unit. As yet another example, if the alert is a visual alert, then the visual alert may correspond to a status icon generated on the mobile terminal display unit.

In step 250, the mobile terminal prompts a user to provide an indication as to whether certain communications should be transmitted immediately. For example, according to exemplary embodiments of the present invention, upon determining that the signal strength of the mobile terminal is low (e.g., lower than a predefined signal strength threshold), the mobile terminal alerts the user that the signal strength is low and queries the user whether as to the user wishes to take specific actions (e.g., before the signal strength is reduced to such an extent that the mobile terminal is able to perform communication with the network). For example, the mobile terminal may query the user whether to contact 911 for an emergency, whether to transmit a draft communication (e.g., email, Short Message Service (SMS) message, and/or the like), whether to transmit a communication to a specific contact so as to inform that contact that the user may be out of reach due to lack of service, whether to transmit a communication to a contact associated with an upcoming scheduled appointment (e.g., a calendar event) so as to inform that contact that the user may be out of reach due to lack of service, and the like.

If the user indicates that a communication is not necessary in response to the prompt provided in step 250, then the mobile terminal ends the process. Otherwise, if the user indicates that a communication is necessary in response to the prompt provided in step 250, then the mobile terminal proceeds to step 260.

In step 260, the mobile terminal transmits the communications that the user identified as being necessary (or preferred) in response to the prompt querying the user as to whether the user wished to transmit a communication immediately based on the signal strength of the mobile terminal being low.

Figure 3:
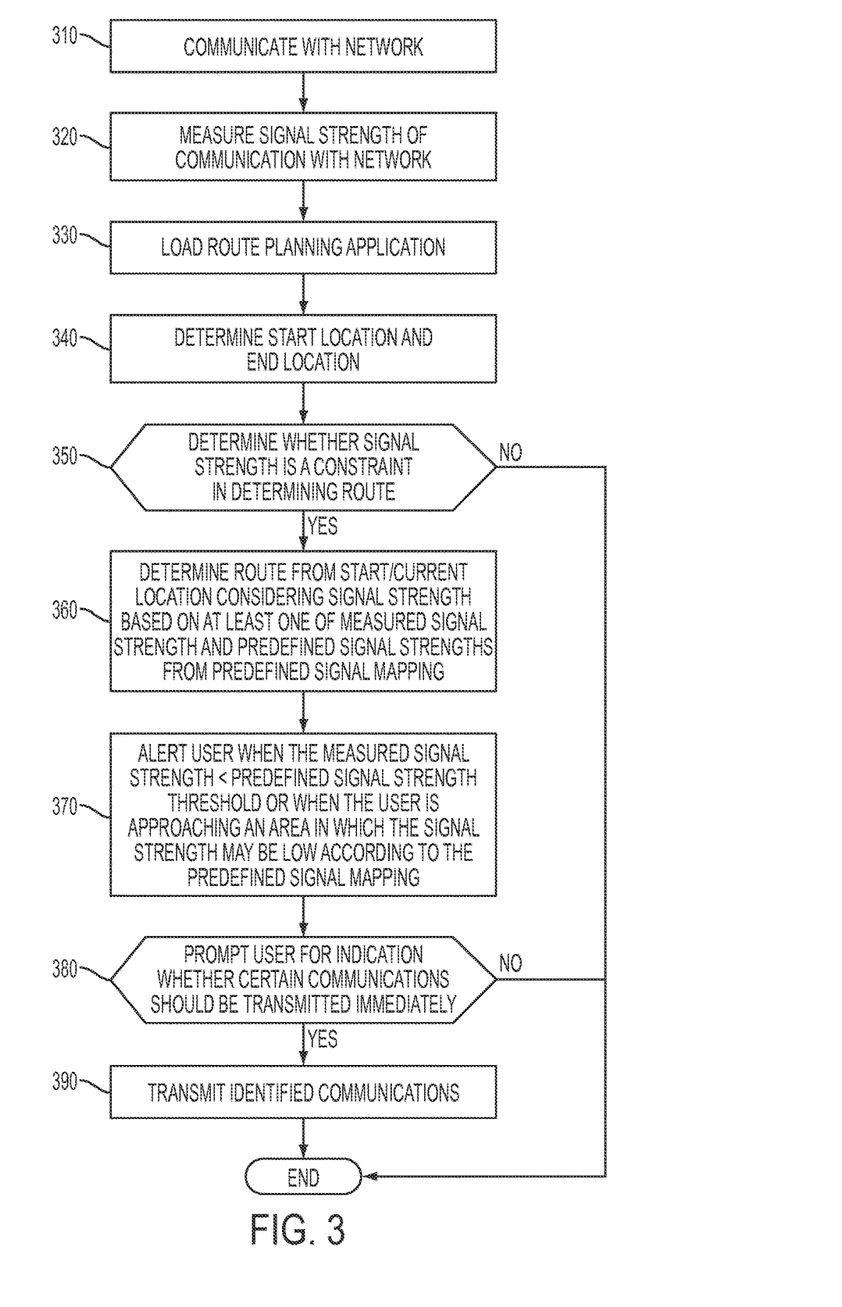
FIG. 3 is a flowchart illustrating a method of mapping a route considering a signal strength of a mobile terminal according to exemplary embodiments of the present invention.

FIG. 3 illustrates a flowchart illustrating a method of mapping a route considering a signal strength of a mobile terminal according to exemplary embodiments of the present invention.

Referring to FIG. 3, a mobile terminal communicates with a network in step 310. For example, the mobile terminal may communicate with a cellular network via a base station. The mobile terminal may transmit and receive voice and/or data communications with the network.

In step 320, the mobile terminal measures the signal strength of the communications with the network. For example, the mobile terminal may measure the signal-to-noise ratio of the signal with which the mobile terminal communicates with the network.

In step 330, the mobile terminal loads a route planning application for planning (e.g., calculating) a route. For example, the route planning application may provide a user with directions from a start location (e.g., a current location) to a desired end location. The route planning application may provide text-based directions, generate visual directions (e.g., provide a map), provide Global Positioning System (GPS) based directions so as to provide contemporaneous directions, and the like.

In step 340, the mobile terminal determines a start location and an end location with which the route planning application generates directions. As an example, the route planning application may query the user to input at least one of a start location and an end location. As another example, the route planning application may also receive at least one of the start location and the end location from a GPS unit. As another example, the route planning application may also receive at least one of the start location and the end location from another application loaded on the mobile terminal. For example, a user may provide an input (e.g., click on a link) in another application loaded on the mobile terminal which loads the route planning application and in doing so the other application may pass at least one of a start location and an end location to the route planning application.

In step 350, the mobile terminal (e.g., the route planning application) determines whether signal strength is a constraint in determining a route. As an example, use of the signal strength of the mobile terminal as a constraint in the determination of a route may be a variable defined in the route planning application settings or the mobile terminal settings. As another example, the mobile terminal (e.g., the route planning application) may query the user whether the user prefers to use the signal strength of the mobile terminal as a constraint in the determination of a route when the route planning application is loaded or when the user requests that the route planning application generates a route.

If the mobile terminal determines that the signal strength of the mobile terminal is not to be used as a constraint in the determination of a route in step 350, the mobile terminal ends the process. According to an alternative embodiment, if the mobile terminal determines that the signal strength of the mobile terminal is not to be used as a constraint in the determination of a route in step 350, the route planning application may generate a route using the identified constraints (of which usage of the signal strength is not one), and thereafter the mobile terminal proceeds to step 370.

In contrast, if the mobile terminal determines that the signal strength of the mobile terminal is to be used as a constraint in the determination of a route in step 350, then the mobile terminal proceeds to step 360.

In step 360, the route planning application determines a route from a start location (e.g., a current location) to an end location. The route planning application considers signal strength of the mobile terminal in determining the route such that the planned route minimizes (or reduces) the portions of the route over which the signal strength of the mobile terminal is lower (or expected to be lower) than a predefined signal strength threshold. As an example, the route planning application may consider signal strength using at least one of the measured signal strength and a predefined signal strength from a predefined signal mapping. For example, the predefined signal mapping may include a mapping of known or expected signal strengths to a geographical (e.g., through commercially or publicly available information). According to exemplary embodiments of the present invention, the route planning application may generate a route and identify portions of the generated route over which the signal strength is lower (or expected to be lower) than a predefined signal strength threshold. The route planning application may also generate a route and identify the signal strength (or expected signal strength) over various portions (segments) of the generated route.

In step 370, the mobile terminal may alert a user when the measured signal strength is less than a predefined signal strength threshold, or when the user is approaching an area (e.g., a portion of the route) over which the signal strength may be low according to the predefined signal mapping. For example, the alert may be an audio signal, a visual alert, a vibration, and/or the like. If the alert is an audio signal, the alert may be a ringtone or other sound configured to alert the user of an event. If the alert is a visual alert, the visual alert may correspond to the flashing of an indicator light on the mobile terminal. As another example, if the alert is a visual alert, then the visual alert may correspond to a pop-up generated on the mobile terminal display unit. As yet another example, if the alert is a visual alert, then the visual alert may correspond to a status icon generated on the mobile terminal display unit.

In step 380, the mobile terminal prompts a user to provide an indication as to whether certain communications should be transmitted immediately. For example, according to exemplary embodiments of the present invention, upon determining that the signal strength of the mobile terminal is low (e.g., lower than a predefined signal strength threshold), the mobile terminal alerts the user that the signal strength is low and queries the user whether the user wishes to take specific actions (e.g., before the signal strength is reduced to such an extent that the mobile terminal is able to perform communication with the network). For example, the mobile terminal may query the user whether to contact 911 for an emergency, whether to transmit a draft communication (e.g., email, Short Message Service (SMS) message, and/or the like), whether to transmit a communication to a specific contact so as to inform that contact that the user may be out of reach due to lack of service, whether to transmit a communication to a contact associated with an upcoming scheduled appointment (e.g., a calendar event) so as to inform that contact that the user may be out of reach due to lack of service, and the like.

According to exemplary embodiments of the present invention, the mobile terminal may prompt the user for an indication as to whether the user prefers that the route planning application re-calculate (generate) another route over which the signal strength may not be expected to (e.g., is unlikely to) drop below the predefined signal strength threshold.

If the user indicates that a communication is not necessary in response to the prompt provided in step 380, then the mobile terminal ends the process. Otherwise, if the user indicates that a communication is necessary in response to the prompt provided in step 380, then the mobile terminal proceeds to step 390.

In step 390, the mobile terminal transmits the communications that the user identified as being necessary (or preferred) in response to the prompt querying the user as to whether the user wished to transmit a communication immediately based on the signal strength of the mobile terminal being low.

Figure 4:
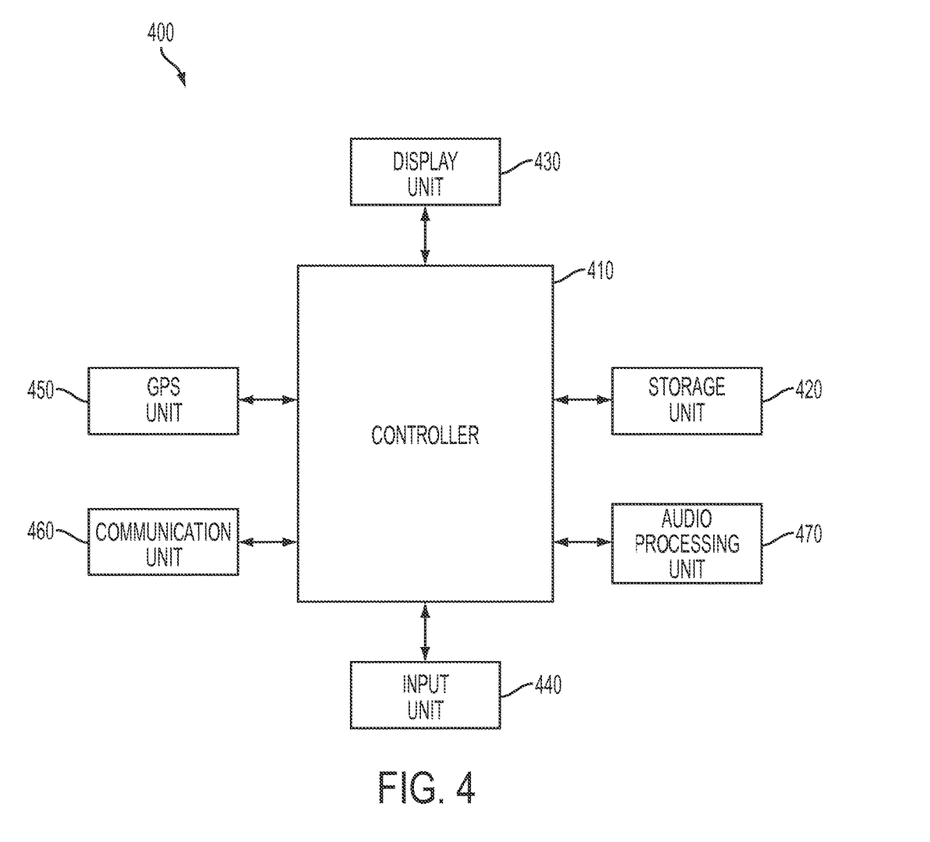
FIG. 4 is a block diagram schematically illustrating a configuration of a mobile terminal according to exemplary embodiments of the present invention.

FIG. 4 is a block diagram schematically illustrating a configuration of a mobile terminal according to exemplary embodiments of the present invention.

Referring to FIG. 4, the mobile terminal 400 includes a controller 410, a storage unit 420, a display unit 430, an input unit 440, and a communication unit 460. According to exemplary embodiments of the present invention, the mobile terminal 400 may also include a GPS unit 450, a location determination unit (not shown), and/or the like. According to exemplary embodiments of the present invention, the mobile terminal 400 may also include an audio processing unit 470.

According to exemplary embodiments of the present invention, the mobile terminal 400 may be configured to alert a user when the signal strength of the mobile terminal 400 is less than a predefined signal strength threshold.

According to exemplary embodiments of the present invention, the mobile terminal 400 may also be configured to take specific actions when the signal strength becomes less than the predefined signal strength threshold. For example, the mobile terminal 400 may alert the user that the signal strength is low and query the user whether as to the user wishes to take specific actions (e.g., before the signal strength is reduced to such an extent that the mobile terminal is able to perform communication with the network). For example, the mobile terminal may query the user whether to contact 911 for an emergency, whether to transmit a draft communication (e.g., email, Short Message Service (SMS) message, and/or the like), whether to transmit a communication to a specific contact so as to inform that contact that the user may be out of reach due to lack of service, whether to transmit a communication to a contact associated with an upcoming scheduled appointment (e.g., a calendar event) so as to inform that contact that the user may be out of reach due to lack of service, and the like.

According to exemplary embodiments of the present invention, the mobile terminal 400 may be configured to generate a route using the signal strength as a constraint in the determination of the route. The mobile terminal 400 determines a route from a start location (e.g., a current location) to an end location. The mobile terminal 400 considers signal strength of the mobile terminal 400 in determining the route such that the planned route minimizes (or reduces) the portions of the route over which the signal strength of the mobile terminal 400 is lower (or expected to be lower) than a predefined signal strength threshold. As an example, the mobile terminal 400 may consider signal strength using at least one of the measured signal strength and a predefined signal strength from a predefined signal mapping. For example, the predefined signal mapping may include a mapping of known or expected signal strengths to a geographical (e.g., through commercially or publicly available information). According to exemplary embodiments of the present invention, the mobile terminal 400 may generate a route and identify portions of the generated route over which the signal strength is lower (or expected to be lower) than a predefined signal strength threshold. The mobile terminal 400 may also generate a route and identify the signal strength (or expected signal strength) over various portions (segments) of the generated route.

According to exemplary embodiments of the present invention, the mobile terminal comprises at least one controller 410. The at least one controller 410 may be configured to operatively control the mobile terminal 400. For example, the controller 410 may control operation of the various components or units included in the mobile terminal 400. The controller 410 may transmit a signal to the various components included in the mobile terminal 400 and control a signal flow between internal blocks of the mobile terminal 400. In particular, the controller 410 according to exemplary embodiments of the present invention can control selection or setting of functions relating to the signal strength of the mobile terminal 400, functions relating to the planning of routes, and the like.

The storage unit 420 can store user data, and the like, as well a program which performs operating functions according to an exemplary embodiment of the present invention. The storage unit may include a non-transitory computer-readable storage medium. As an example, the storage unit 420 may store a program for controlling general operation of a mobile terminal 400, an Operating System (OS) which boots the mobile terminal 400, and application program for performing other optional functions such as a camera function, a sound replay function, an image or video replay function, a signal strength measurement function, a route generation function, and the like. Further, the storage unit 420 may store user data generated according to a user of the mobile terminal, such as, for example, a text message, a game file, a music file, a movie file, and the like. In particular, the storage unit 420 according to exemplary embodiments of the present invention may store an application that alert a user when the signal strength of the mobile terminal 400 is less than a predefined signal strength threshold. For example, the storage unit 420 may store a route planning application that generates a route using the signal strength as a constraint in the determination of the route. The route planning application considers signal strength of the mobile terminal 400 in determining the route such that the planned route minimizes (or reduces) the portions of the route over which the signal strength of the mobile terminal 400 is lower (or expected to be lower) than a predefined signal strength threshold. As an example, the route planning application may consider signal strength using at least one of the measured signal strength and a predefined signal strength from a predefined signal mapping. For example, the predefined signal mapping may include a mapping of known or expected signal strengths to a geographical (e.g., through commercially or publicly available information). According to exemplary embodiments of the present invention, the route planning application may generate a route and identify portions of the generated route over which the signal strength is lower (or expected to be lower) than a predefined signal strength threshold. The route planning application may also generate a route and identify the signal strength (or expected signal strength) over various portions (segments) of the generated route.

The display unit 430 displays information inputted by user or information to be provided to user as well as various menus of the mobile terminal 400. For example, the display unit 430 may provide various screens according to a user of the mobile terminal 400, such as an idle screen, a message writing screen, a calling screen, a route planning screen, and the like. In particular, the display unit 430 according to exemplary embodiments of the present invention can display a menu. The menu may include a list of functions relating to the signal strength of the mobile terminal 400. For example, the menu may include a list including a function for setting a predefined signal strength threshold, a function for setting predefined actions to take when the signal strength of the mobile terminal 400 becomes less than the predefined signal strength threshold, a function for setting signal strength of the mobile terminal 400 as a constraint in a route planning function, and the like. For example, the display unit 430 may display an interface which the user may manipulate or otherwise enter inputs via a touch screen to enter selection of the function relating to the signal strength of the mobile terminal 400. The display unit 430 can be formed as a Liquid Crystal Display (LCD), an Organic Light Emitting Diode (OLED), an Active Matrix Organic Light Emitting Diode (AMOLED), and the like. However, exemplary embodiments of the present invention are not limited to these examples. Further, the display unit 430 can perform the function of the input unit 440 if the display unit 430 is formed as a touch screen.

The input unit 440 may include input keys and function keys for receiving user input. For example, the input unit 440 may include input keys and function keys for receiving an input of numbers or various sets of letter information, setting various functions, and controlling functions of the mobile terminal 400. For example, the input unit 440 may include a calling key for requesting a voice call, a video call request key for requesting a video call, a termination key for requesting termination of a voice call or a video call, a volume key for adjusting output volume of an audio signal, a direction key, and the like. In particular, the input unit 440 according to exemplary embodiments of the present invention may transmit to the controller 410 signals related to selection or setting of functions relating to the signal strength of the mobile terminal 400, functions relating to the planning of routes, and the like. Such an input unit 440 may be formed by one or a combination of input means such as a touch pad, a touchscreen, a button-type key pad, a joystick, a wheel key, and the like.

The GPS unit 450 may be configured to communicate with various GPS systems. For example, the GPS unit 450 may receive location data with which the mobile terminal 400 may determine (e.g., calculate) a current location of the mobile terminal 400.

The communication unit 460 may be configured for communicating with other devices. For example, the communication unit 460 may be configured to communicate via Bluetooth technology, WiFi technology, or another wireless technology. According to exemplary embodiments of the present invention, the mobile terminal 400 communicates with the communication unit 460 using transmission and reception of signals that may be measured to determine the signal strength with which the mobile terminal 400 is communicating.

The audio processing unit 470 may be formed as an acoustic component. The audio processing unit 470 transmits and receives audio signals, and encodes and decodes the audio signals. For example, the audio processing unit 470 may include a CODEC and an audio amplifier. The audio processing unit 470 is connected to a Microphone (MIC) and a Speaker (SPK). The audio processing unit 470 converts analog voice signals inputted from the Microphone (MIC) into digital voice signals, generates corresponding data for the digital voice signals, and transmits the data to the controller 410. Further, the audio processing unit 470 converts digital voice signals inputted from the controller 410 into analog voice signals, and outputs the analog voice signals through the Speaker (SPK). Further, the audio processing unit 470 may output various audio signals generated in the mobile terminal 400 through the Speaker (SPK). For example, the audio processing unit 470 can output audio signals according to an audio file (e.g. MP3 file) replay, a moving picture file replay, and the like through the speaker. In particular, according to exemplary embodiments of the present invention, the audio processing unit may output an alert such as, for example, an alert indicating that the signal strength of the mobile terminal 400 is low.

According to exemplary embodiments of the present invention, the audio processing unit 470 may output an indication that the mobile terminal 400 is approaching an area of a generated route in which the signal strength of the mobile terminal 400 is expected or is likely to be low. According to exemplary embodiments of the present invention, the audio processing unit 470 may output a prompt for an indication as to whether certain communication should be transmitted upon determining that the signal strength of the mobile terminal 400 is low, or upon determining that the mobile terminal 400 is approaching an area of a generated route in which the signal strength of the mobile terminal 400 is expected or is likely to be low. According to exemplary embodiments of the present invention, the audio processing unit 470 may receive and process an input in response to an indication as to whether certain communication should be transmitted upon determining that the signal strength of the mobile terminal 400 is low, or upon determining that the mobile terminal 400 is approaching an area of a generated route in which the signal strength of the mobile terminal 400 is expected or is likely to be low.

Figure 5:
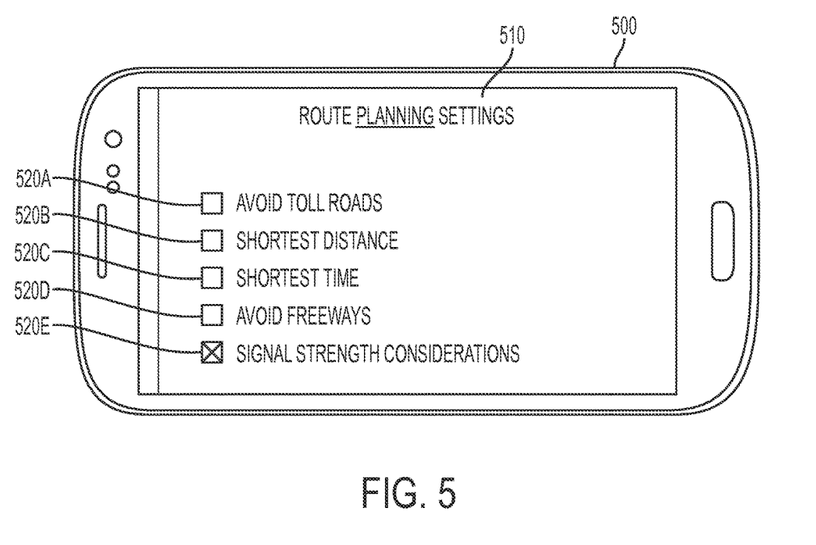
FIG. 5 is an illustration of a screen displayed on a mobile terminal from which route planning settings may be configured according to an exemplary embodiment of the present invention.

FIG. 5 is an illustration of a screen displayed on a mobile terminal from which route planning settings may be configured according to an exemplary embodiment of the present invention.

Referring to FIG. 5, the mobile terminal 500 may display a screen 510 from which a user may configure settings of the route planning application. For example, the screen 510 may display a route planning settings screen which allows a user to configure constraints used by the route planning application in determining a route. According to exemplary embodiments of the present invention, the constraints used by the route planning application may include whether to avoid toll roads 520A (e.g., subject to the other selected constraints), whether to determine a route using the shortest distance 520B (e.g., subject to the other selected constraints), whether to determine a route based on a route that is estimated to have the shortest time until arrival 520C (e.g., subject to the other selected constraints), whether the determined route should avoid freeways 520D (e.g., subject to the other selected constraints), and whether the route should be determined using signal strength considerations 520E (e.g., subject to the other selected constraints). According to exemplary embodiments of the present invention, the route planning application may allow a user to rank the selected constraints according to a preferred order of priority.

Figure 6:
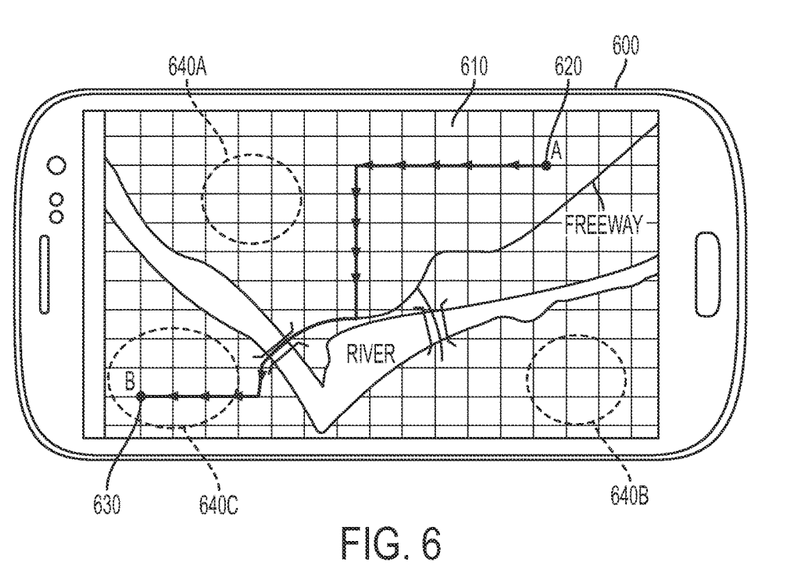
FIG. 6 is an illustration of a screen displayed by a route planning application according to an exemplary embodiment of the present invention.

FIG. 6 is an illustration of a screen displayed by a route planning application according to an exemplary embodiment of the present invention.

Referring to FIG. 6, the mobile terminal 600 may display a screen 610 on which a determined route is displayed overlaid on a map. For example, the mobile terminal 600 (e.g., the route planning application) may determine a route between a starting point 620 and a destination 630. According to exemplary embodiments of the present invention, the mobile terminal 600 may also display on the screen 610 zones 640A, 640B, and 640C in which the signal strength is expected to be lower than a predefined threshold. The display of the zones 640A, 640B, and 640C alerts a user of nearby areas in which the signal strength of the mobile terminal 600 is expected to drop below the predefined threshold.

Figure 7A:
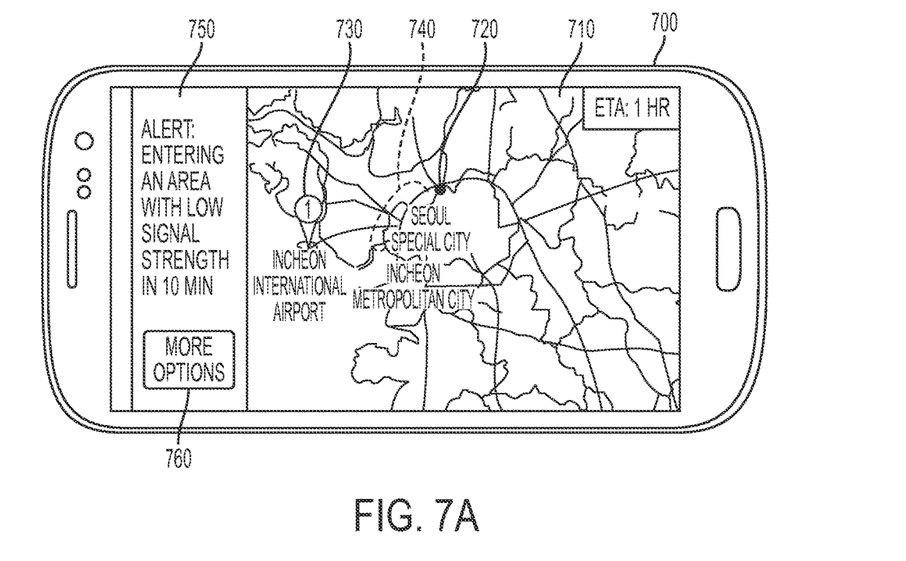
FIGS. 7A and 7B are illustrations of screens displayed by a route planning application according to an exemplary embodiment of the present invention.
Figure 7B:
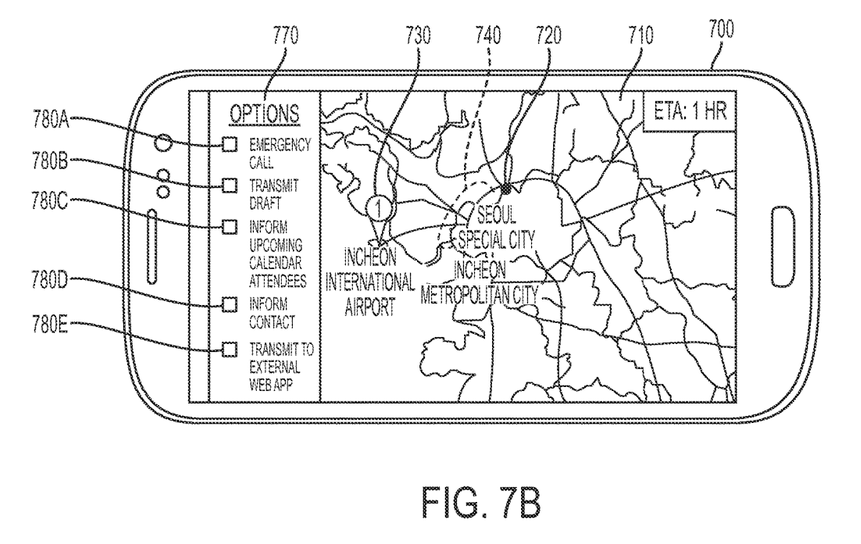

FIGS. 7A and 7B are illustrations of screens displayed by a route planning application according to an exemplary embodiment of the present invention.

Referring to FIGS. 7A and 7B, the mobile terminal 700 may display a screen 710 on which a determined route is displayed overlaid on a map. The screen 710 may include a starting point 720 and a destination 730. In addition, the screen 710 may display a zone 740 in which the signal strength (e.g., measured signal strength or expected signal strength) is lower than a predefined threshold.

According to exemplary embodiments of the present invention, when the mobile terminal 700 enters a zone 740 in which the signal strength is less than the predefined threshold, mobile terminal 700 displays an alert 750 on the screen 710. According to exemplary embodiments of the present invention, the alert 750 may be displayed when the mobile terminal 700 is approaching a zone 740 in which the signal strength is less than the predefined threshold (e.g., when the mobile terminal 700 is within a predefined distance from the zone 740).

The alert 750 may inform the user that the mobile terminal 700 is approaching the zone 740 in which the signal strength is less than the predefined threshold. The alert 750 may inform the user of the distance which the mobile terminal 700 is from the zone 740. The alert 750 may inform the user of the estimated amount of time in which the mobile terminal 700 will enter the zone 740.

According to exemplary embodiments of the present invention, the alert 750 may allow selection from various actions which the mobile terminal 700 should perform before the mobile terminal 700 enters the zone 740. The alert 750 may allow selection from various actions which the mobile terminal 700 should perform while the mobile terminal 700 is within the zone 740. For example, the alert 750 may display a more options button 760 which when selected displays various options of actions from which the user may select.

If the user selects the more options button 760, the mobile terminal 700 may display an options window 770 on the screen. The options window 770 may display a list of options of actions which the mobile terminal 700 may take before entering the zone 740 or when the mobile terminal 700 is within the zone 740 depending on the configuration of the mobile terminal 700 (e.g., the route planning application). For example, the options window 770 may display a list of options of actions that includes making an emergency call 780A, transmitting draft communications 780B (e.g., texts, emails, and the like), inform upcoming calendar attendees 780C of the possibility that the mobile terminal 700 will be without service while the mobile terminal 700 is within the zone 740, informing a contact 780D (e.g., either a predefined contact, or a contact selected upon selection of the informing a contact option), and performing a transmission to an external web application (e.g., transmitting to a social networking website of a status update, and the like).

According to exemplary embodiments of the present invention, when a user selects an option from the option screen 770, the mobile terminal 700 may perform the associated action. According to exemplary embodiments of the present invention, when a user selects an option from the option screen 770, the mobile terminal may perform the associated action when the mobile terminal 700 enters the zone 740, or when the mobile terminal 700 becomes a predefined distance from the zone 740.

As a non-exhaustive illustration only, a mobile terminal described herein may refer to mobile devices such as a cellular phone, a personal digital assistant (PDA), a digital camera, a portable game console, an MP3 player, a Portable/Personal Multimedia Player (PMP), a handheld e-book, a portable lap-top Personal Computer (PC), a tablet PC, a Global Positioning System (GPS) navigation, and the like capable of wireless communication or network communication consistent with that disclosed herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating an alert on a mobile terminal based on signal strength of the mobile terminal, the method comprising:

measuring, at the mobile terminal, a signal strength with which the mobile terminal communicates with a network;

determining whether the measured signal strength is less than a predefined signal strength threshold; and when the measured signal strength is less than the predefined signal strength threshold:

generating, at the mobile terminal, an alert indicating that the signal strength of the mobile terminal is below a threshold configured by a user input, generating, at the mobile terminal, a prompt for an indication as to whether a specific communication of a plurality of displayed communication types should be transmitted in response to the measured signal strength being less than the predefined signal strength threshold, receiving the indication as to whether the specific communication should be transmitted, the indication being input at the mobile terminal, and when the indication as to whether the specific communication confirms that the specific communication should be transmitted, transmitting an identified communication corresponding to the specific communication corresponding to the indication.

2. The method of claim 1, further comprising:
setting the predefined signal strength threshold.

3. The method of claim 1, wherein the identified communication includes at least one of:
transmission of a communication to 911 for an emergency;
transmission of a draft communication;
transmission to a specific contact so as to inform the specific contact that the user may be out of reach due to lack of service; or
transmission to a contact associated with an upcoming calendar event so as to inform that contact that the user may be out of reach due to lack of service.

4. The method of claim 1, wherein the alert is at least one of an audio alert, a visual alert, or a vibration.

5. A method for generating a route considering a signal strength of a mobile terminal, the method comprising:
determining a start location and an end location of the route;
determining whether the signal strength of the mobile terminal is a constraint along the route between the start location and the end location;
when the signal strength of the mobile terminal is a constraint of along the route between the start location and the end location, generating the route considering a predefined signal mapping so as to minimize portions of the route having a low signal strength; and
generating, at the mobile terminal, a prompt for an indication as to whether a specific communication of a plurality of displayed communication types should be transmitted in response to a measurement of the signal strength along the route being less than a predefined signal strength threshold that is configured by a user input,
wherein generating the route considering the predefined signal mapping comprises:
identifying the predefined signal strength threshold, and
planning the route between the start location and the end location over which the portions of the route having the signal strength below the predefined signal strength threshold are reduced in consideration of other constraints in the determination of the route.

6. The method of claim 5, wherein the determining of the start location comprises determining a current location from a global positioning system signal.

7. The method of claim 5, wherein the determining whether the signal strength is a constraint along the route between the start location and the end location comprises:
upon loading of a route planning application on the mobile terminal, prompting a user for a selection as to whether the signal strength is a constraint.

8. The method of claim 5, further comprising:
if the measurement of the signal strength along the route is less than the predefined signal strength threshold, generating an alert indicating that the signal strength of the mobile terminal is less than the predefined signal strength threshold.

9. The method of claim 5, further comprising:
receiving the indication as to whether the specific communication should be transmitted; and
if the indication as to whether the specific communication confirms that the specific communication should be transmitted, transmitting an identified communication corresponding to the specific communication.

10. The method of claim 9, wherein the identified communication includes at least one of:
transmission of a communication to 911 for an emergency;
transmission of a draft communication;
transmission to a specific contact so as to inform the specific contact that a user may be out of reach due to lack of service;
transmission to a contact associated with an upcoming calendar event so as to inform that contact that the user may be out of reach due to lack of service; or
transmission to an external web application.

11. The method of claim 5, further comprising:
determining an expected signal strength corresponding to a location based on the predefined signal mapping.

12. The method of claim 11, further comprising:
determining a current location from a global positioning system signal;
determining whether the mobile terminal is within a predefined proximity of an area, the expected signal strength corresponding thereto being less than the predefined signal strength threshold; and
if the mobile terminal is within the predefined proximity of an area where the expected signal strength corresponding thereto is less than the predefined signal strength threshold, generating an alert indicating that the signal strength of the mobile terminal is approaching an area in which the signal strength of the mobile terminal will likely be less than the predefined signal strength threshold.

13. The method of claim 12, further comprising:
receiving the indication as to whether the specific communication should be transmitted; and
if the indication as to whether the specific communication confirms that the specific communication should be transmitted, transmitting an identified communication corresponding to the specific communication.

14. The method of claim 13, wherein the identified communication includes at least one of:
transmission of a communication to 911 for an emergency;
transmission of a draft communication;
transmission to a specific contact so as to inform the specific contact that a user may be out of reach due to lack of service;
transmission to a contact associated with an upcoming calendar event so as to inform that contact that the user may be out of reach due to lack of service; or
transmission to an external web application.

15. A mobile terminal for generating an alert thereon based on signal strength, the mobile terminal comprising:
at least one of an audio processor or a display;
an input interface;
a communication interface configured to communicate with a network; and at least one processor configured to:
measure a signal strength with which the communication interface communicates with the network,
determine whether the measured signal strength is less than a predefined signal strength threshold, and
if the measured signal strength is less than the predefined signal strength threshold:
generate, at the mobile terminal, an alert indicating that the signal strength of the mobile terminal is below a threshold configured by a user input,
generate, at the mobile terminal, a prompt for an indication as to whether a specific communication of a plurality of displayed communication types should be transmitted in response to the measured signal strength being less than the predefined signal strength threshold,
receive, via the input interface of the mobile terminal, the indication as to whether the specific communication should be transmitted, and
transmit, if the indication as to whether the specific communication confirms that the specific communication should be transmitted, an identified communication corresponding to the specific communication,
wherein the alert is output through at least one of the audio processor or the display.

16. The mobile terminal of claim 15, wherein the at least one processor is further configured to set the predefined signal strength threshold.

17. The mobile terminal of claim 15, wherein the identified communication includes at least one of:
transmission of a communication to 911 for an emergency;
transmission of a draft communication;
transmission to a specific contact so as to inform the specific contact that the user may be out of reach due to lack of service;
transmission to a contact associated with an upcoming calendar event so as to inform that contact that the user may be out of reach due to lack of service; or
transmission to an external web application.

18. The mobile terminal of claim 15, wherein the alert is at least one of an audio alert, a visual alert, or a vibration.

19. A mobile terminal for generating a route considering a signal strength of the mobile terminal, the mobile terminal comprising:
a display; and
at least one processor configured to:
determine a start location and an end location of the route,
determine whether signal strength of the mobile terminal is a constraint along the route between the start location and the end location,
generate, if the signal strength of the mobile terminal is a constraint along the route between the start location and the end location, the route considering a predefined signal mapping so as to minimize portions of the route having a low signal strength, wherein to generate the route, the processor is further configured to:
identify a predefined signal strength threshold that is configured by a user input, and
plan the route between the start location and the end location over which the portions of the route having the signal strength below the predefined signal strength threshold are reduced in consideration of other constraints in the determination of the route, and
output the route via the display, and
generate a prompt for an indication as to whether a specific communication should be transmitted in response to a measurement of the signal strength being less than the predefined signal strength threshold.

20. The mobile terminal of claim 19, further comprising:
a global positioning system (GPS) unit configured to receive location information,
wherein the at least one processor is further configured to determine the start location by determining a current location using the received location information from the GPS unit.

21. The mobile terminal of claim 19, wherein the at least one processor is further configured to determine whether the signal strength is a constraint along the route between the start location and the end location by, upon loading of a route planning application on the mobile terminal, prompting a user for a selection as to whether the signal strength is a constraint.

22. The mobile terminal of claim 19, further comprising:
an audio processor,
wherein the at least one processor is further configured to:
generate, if the measurement of the signal strength along the route is less than the predefined signal strength threshold, an alert indicating that the signal strength of the mobile terminal is less than the predefined signal strength threshold, and
wherein the alert is output through at least one of the audio processor or the display.

23. The mobile terminal of claim 22, further comprising:
an input interface,
wherein the at least one processor is further configured to:
receive, via the input interface, the indication as to whether the specific communication should be transmitted, and
transmit, if the indication as to whether the specific communication confirms that the specific communication should be transmitted, an identified communication corresponding to the specific communication.

24. The mobile terminal of claim 23, wherein the identified communication includes at least one of:
transmission of a communication to 911 for an emergency;
transmission of a draft communication;
transmission to a specific contact so as to inform the specific contact that a user may be out of reach due to lack of service;
transmission to a contact associated with an upcoming calendar event so as to inform that contact that the user may be out of reach due to lack of service; or
transmission to an external web application.

25. The mobile terminal of claim 19, wherein the at least one processor is further configured to determine an expected signal strength corresponding to a location based on the predefined signal mapping.

26. The mobile terminal of claim 25, further comprising:
an audio processor; and
a global positioning system (GPS) unit for receiving location information,
wherein the at least one processor is further configured to:
determine a current location using the location information, determine whether the mobile terminal is within a predefined proximity of an area wherein the expected signal strength corresponding thereto is less than the predefined signal strength threshold, and generate, if the mobile terminal is within the predefined proximity of an area where the expected signal strength corresponding thereto is less than the predefined signal strength threshold, an alert indicating that the signal strength of the mobile terminal is approaching an area in which the signal strength of the mobile terminal will likely be less than the predefined signal strength threshold, wherein the alert is output through at least one of the audio processor or the display.

27. The mobile terminal of claim 26, further comprising:
an input interface,
wherein the at least one processor is further configured to:
receive, via the input interface, the indication as to whether the specific communication should be transmitted, and
transmit, if the indication as to whether the specific communication confirms that the specific communication should be transmitted, an identified communication corresponding to the specific communication.

28. The mobile terminal of claim 27, wherein the identified communication includes at least one of:
transmission of a communication to 911 for an emergency;
transmission of a draft communication;
transmission to a specific contact so as to inform the specific contact that a user may be out of reach due to lack of service;
transmission to a contact associated with an upcoming calendar event so as to inform that contact that the user may be out of reach due to lack of service; or
transmission to an external web application.

* * * * *

UNITED STATES PATENT AND TRADEMARK OFFICE
CERTIFICATE OF CORRECTION

| | | |
|---|---|---|
| PATENT NO. | : 10,375,594 B2 | Page 1 of 1 |
| APPLICATION NO. | : 13/765095 | |
| DATED | : August 6, 2019 | |
| INVENTOR(S) | : Zhou et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 675 days.

Signed and Sealed this
Fourteenth Day of January, 2020

Andrei Iancu
*Director of the United States Patent and Trademark Office*